United States Patent
Barrow et al.

(10) Patent No.: US 7,636,580 B1
(45) Date of Patent: Dec. 22, 2009

(54) METHOD AND APPARATUS FOR HANDLING INTEGRATED DIGITAL ENHANCED NETWORK CALLING RESTRICTIONS

(75) Inventors: Steven W. Barrow, South Riding, VA (US); Safwan A. Khan, Gainesville, VA (US)

(73) Assignee: Nextel Communications Inc., Reston, VA (US)

(*) Notice: Subject to any disclaimer, the term of this patent is extended or adjusted under 35 U.S.C. 154(b) by 575 days.

(21) Appl. No.: 11/650,715

(22) Filed: Jan. 5, 2007

(51) Int. Cl.
*H04M 1/00* (2006.01)
(52) U.S. Cl. ....................... 455/518; 455/517
(58) Field of Classification Search .................. 455/517, 455/518
See application file for complete search history.

(56) References Cited

U.S. PATENT DOCUMENTS

| 7,054,302 B2 * | 5/2006 | Albal et al. ................. 370/347 |
| 2003/0236093 A1 * | 12/2003 | Drozt et al. ................. 455/450 |
| 2005/0180389 A1 * | 8/2005 | Xenakis et al. ............. 370/351 |
| 2006/0190729 A1 * | 8/2006 | Uchida ....................... 713/168 |

* cited by examiner

*Primary Examiner*—Matthew D Anderson
*Assistant Examiner*—Bobbak Safaipour

(57) ABSTRACT

A method and system for placing a dispatch call from an Integrated Digital Enhanced Network (iDEN) to a non-iDEN network is disclosed. An inter-urban call restriction check process is performed by an iDEN dispatch call processor if a response to a query indicates that a target dispatch call processor associated with a called entity is associated with the iDEN network and the inter-urban call restriction check process is not performed by the iDEN dispatch call processor if the response indicates that the target dispatch call processor is associated with the non-iDEN network.

20 Claims, 2 Drawing Sheets

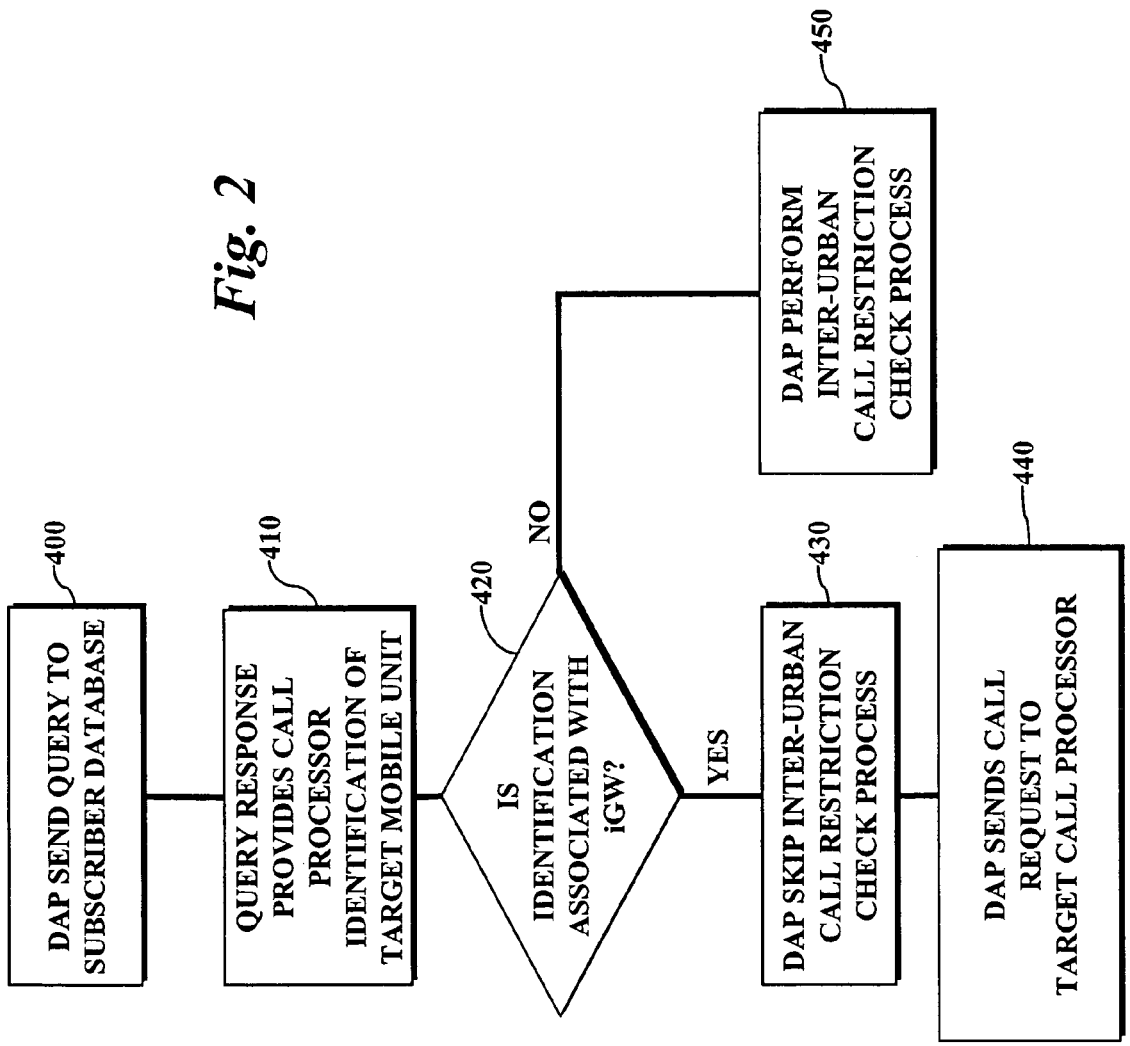

METHOD AND APPARATUS FOR HANDLING INTEGRATED DIGITAL ENHANCED NETWORK CALLING RESTRICTIONS

FIELD OF THE INVENTION

The present invention relates generally to the field of telecommunications, and in particular, to a method and apparatus for handling calling restrictions for dispatch calls made from the Integrated Digital Enhanced Network (iDEN) to a non-iDEN network.

BACKGROUND OF THE INVENTION

The Integrated Digital Enhanced Network (iDEN) is a network provided by Motorola, and utilized by Sprint Nextel Corporation, for providing service for dispatch calls. As is known, a dispatch call is commonly known as a "walkie-talkie" type of call, such as provided by Sprint Nextel Corporation and identified by the trade names Push-To-Talk (PTT) or Direct Connect. Thus, dispatch communications are half-duplex communications where only one person at a time is able to speak.

The iDEN network is organized into different urban areas, where each urban area covers a wide geographic region. Some subscribers to Sprint Nextel's dispatch service are restricted from placing dispatch calls across different urban areas. Thus, these subscribers are generally known as being Nationwide Direct Connect (NDC) restricted and are only able to place calls within a particular urban area (intra-urban calling). Any attempt to place a dispatch call to another urban area (inter-urban calling) will be rejected by the dispatch call processor, e.g., a dispatch application processor (DAP), that services the caller in the caller's urban.

As is known, to enforce the NDC restrictions, the caller's DAP is able to determine when the caller is attempting to place a call to another urban. The caller's DAP recognizes that the DAP that services the called party resides in a different urban. As a result of the caller's DAP recognizing that the called party's DAP is located in a different urban, the caller's DAP rejects the call request. This NDC call restriction logic is programmed into the DAP.

Whereas this NDC inter-urban call restriction logic is effectively utilized by the iDEN network for dispatch calls between parties that solely utilize the iDEN network, increasingly iDEN network subscribers are attempting to place dispatch calls to other Sprint Nextel subscribers that have migrated to 3G technologies for dispatch calls, to non-Sprint Nextel subscribers that are utilizing 3G technologies for dispatch calls, and to 3$^{rd}$ Party PTT applications like Push-to-X services, where X can be sports, weather, stock quotes, etc. In all of these cases, when a Sprint Nextel subscriber utilizing the iDEN network attempts to place a dispatch call to a called party or application that is not utilizing the iDEN network, the iDEN network must send the call request to an iDEN Gateway (iGW) that provides interoperability between the iDEN network and the non-iDEN network, e.g., a 3G network. Thus, the calling party's DAP must send the call request to the iGW. This presents drawbacks for iDEN calling parties that are NDC restricted.

In the protocol of the iDEN network, the calling party's DAP recognizes the iGW as a different urban. Therefore, if the calling party is NDC restricted, and thus restricted from placing inter-urban calls, the calling party is not able to place dispatch calls to a non-iDEN network through the iGW. This is so because the DAP will reject this call request since the iGW is recognized as a different urban by the DAP when the DAP performs an NDC restrictions check. One approach for attempting to resolve this issue could be to change the NDC restrictions check so that these types of calls are permitted. However, changing the restrictions check could be complex and costly.

Therefore, there is a need to provide a method and apparatus for handling calling restrictions for dispatch calls made from the iDEN network to a non-iDEN network.

SUMMARY OF THE INVENTION

In a method for placing a dispatch call from an Integrated Digital Enhanced Network (iDEN) to a non-iDEN network, the method includes performing an inter-urban call restriction check process by an iDEN dispatch call processor if a response to a query indicates that a target dispatch call processor associated with a called entity is associated with the iDEN network. The inter-urban call restriction check process is not performed by the iDEN dispatch call processor if the response indicates that the target dispatch call processor is associated with the non-iDEN network.

In a system for placing a dispatch call from an Integrated Digital Enhanced Network (iDEN) to a non-iDEN network, the system includes the iDEN dispatch call processor associated with a mobile unit of a calling party and the target dispatch call processor associated with a called entity. The iDEN dispatch call processor performs the inter-urban call restriction check process if the response to the query indicates that the target dispatch call processor is associated with the iDEN network and the iDEN dispatch call processor does not perform the inter-urban call restriction check process if the response indicates that the target dispatch call processor is associated with the non-iDEN network.

BRIEF DESCRIPTION OF THE DRAWINGS

FIG. 2 illustrates a method in accordance with the principles of the present invention.

DETAILED DESCRIPTION OF THE EXEMPLARY EMBODIMENTS

Figure 1:
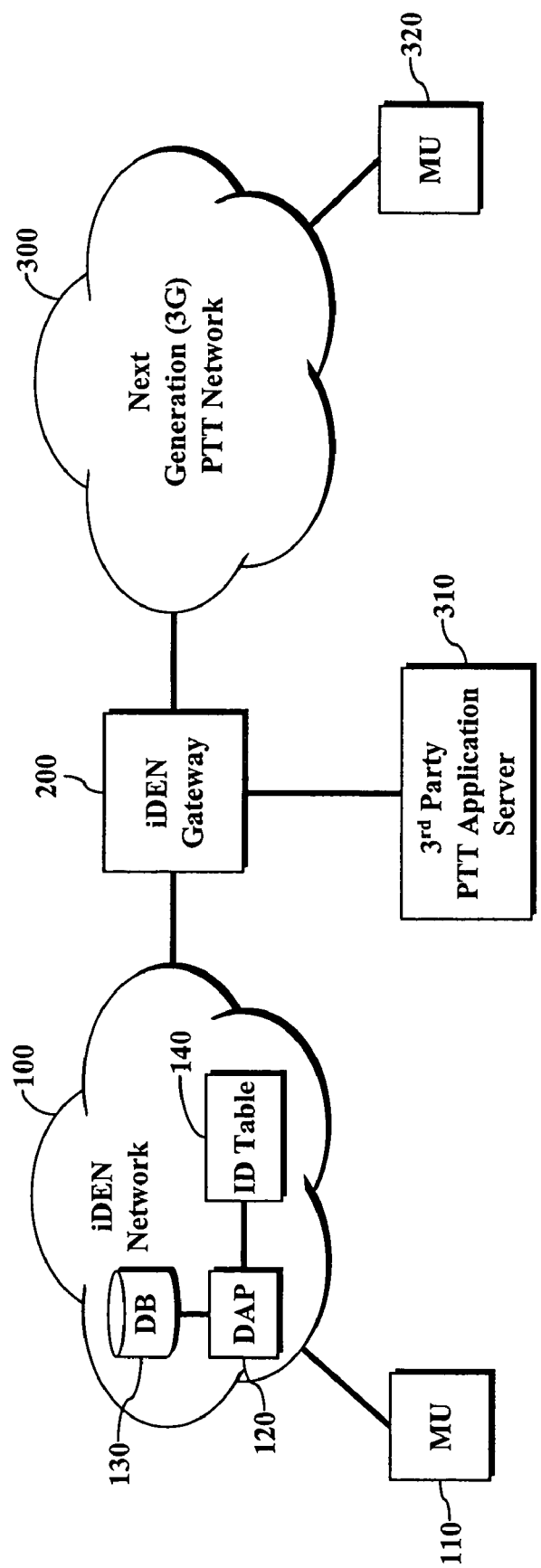
FIG. 1 illustrates an architecture for a dispatch network in accordance with the principles of the present invention.

FIG. 1 illustrates an architecture for a dispatch network in which the present invention can be utilized. As can be seen, the architecture includes an Integrated Digital Enhanced Network (iDEN) 100, an iDEN gateway (iGW) 200, a next generation (3G) PTT network 300, and a 3$^{rd}$ Party dispatch (e.g., PTT) application server 310. The iDEN network, as is known, is provided by Motorola and provides, generally, for dispatch communication services. As is also known, and as discussed above, dispatch communications are half-duplex communications where only one person at a time is able to speak. The iDEN network includes, among other components, a dispatch call processor, e.g., DAP 120, and a subscriber database 130. Since these components, and the functionality of the DAP and the subscriber database, are known to those of skill in the art, no further general explanation will be provided. However, additional functionality for the DAP in accordance with the principles of the present invention will be discussed later in this specification.

Further in the architecture, the iGW 200 provides for interoperability between the iDEN network 100 and a non-iDEN network, e.g., the next generation (3G) PTT network 300 and 3$^{rd}$ Party PTT application server 310. The next generation PTT network and the 3$^{rd}$ Party PTT application server also provide dispatch communications services but utilize a different technology than the iDEN network. Thus, the gateway provides for interoperability between these technologies. The next generation PTT network is not limited to any particular technology. One example of such a technology is the code division multiple access (CDMA) technology, as provided by Qualcomm with its QChat technology. The next generation PTT network can also use Push-to-Talk over Cellular (PoC) technology, which can be used with various access technologies, like CDMA, GSM or WiMAX.

As illustrated in FIG. 1, mobile communications unit 110 is a unit that utilizes a communications service provider's iDEN network, and thus the iDEN technology, for dispatch communications. Mobile communications unit 320 is represented in FIG. 1 as being associated with the 3G network 300. The present invention is not limited to how mobile communications unit 320 is associated with the 3G network. The unit 320 may be associated with a subscriber of the same service provider that provides dispatch service to unit 110, and thus, be a mobile unit that has been migrated to using the 3G technology from the iDEN technology. For example, mobile unit 320 may be migrated from the iDEN technology of the service provider to CDMA technology as used by the service provider. Alternatively, unit 320 could be associated with a 3G network of a different service provider. Regardless, mobile unit 110, which utilizes iDEN technology for dispatch calls, desires to make a dispatch call to either mobile unit 320 or to $3^{rd}$ Party PTT application server 310. Thus, the mobile unit 320 and $3^{rd}$ Party PTT application server 310 are associated with target dispatch call processors.

As discussed previously, problems can result when mobile unit 110, which is inter-urban call restricted, attempts to place a dispatch call to mobile unit 320 or attempts to call the $3^{rd}$ Party PTT application server 310. In this circumstance, the iDEN network must send the call request to the iGW 200, which provides interoperability between the iDEN network and the 3G PTT network, and between the iDEN Network and the $3^{rd}$ Party PTT application server 310. In the protocol of the iDEN network, the calling party's DAP 120 recognizes the iGW 200 as a different urban. Therefore, if the calling party is inter-urban call restricted, e.g., NDC call restricted, and thus restricted from placing inter-urban calls, the calling party using mobile unit 110 is not able to place dispatch calls to a called party using mobile unit 320 or to the $3^{rd}$ Party PTT application server 310, since the iGW 200 is recognized as a different urban by the DAP when the DAP performs an inter-urban restrictions check.

The present invention provides utility particularly in this circumstance where mobile unit 110 (the calling party) places a dispatch call to mobile unit 320 (the called party) which utilizes the 3G network 300 or mobile unit 110 places a dispatch call to the $3^{rd}$ Party PTT application server 310. In accordance with the principles of the present invention, the present invention provides for establishment of the dispatch call with mobile unit 320 or with the $3^{rd}$ Party PTT application server 310 even when mobile unit 110 is inter-urban call restricted. As will be discussed further later in this specification, the present invention modifies the iDEN DAP 120 of the calling party to include a call processor identification table 140 which is internal to the DAP and the iDEN DAP is modified to interpret and use an identification associated with a target dispatch call processor associated with either mobile unit 320 or $3^{rd}$ Party PTT application server 310. If the identification indicates that the target call processor is associated with the iDEN Gateway 200, the iDEN DAP 120 does not perform the inter-urban call restriction check process, and thus, the call is automatically permitted from unit 110 to unit 320 or server 310. Therefore, for this call restricted mobile unit 110, a call to mobile unit 320 or server 310, via iDEN Gateway 200, will be permitted. As discussed previously, without the present invention, this call attempt would be rejected because DAP 120 would recognize iGW 200 as an inter-urban DAP. In the present invention, DAP 120 skips the inter-urban call restriction check process because the iGW is recognized as such by DAP 120 based on the identification received at DAP 120. Thus, the call attempt is completed whereas otherwise, without the present invention, the call attempt would be rejected. The identification is required because, with the protocol of the iDEN network, all DAPs recognize all other call processors in the system as another DAP and have no way of distinguishing a call processor associated with the iGW from one associated with a different urban DAP.

Continuing further with a description of the present invention in connection with FIGS. 1 and 2, as described above, iDEN mobile unit 110 places a dispatch call attempt to 3G network mobile unit 320 via DAP 120 or iDEN mobile unit 110 places a dispatch call attempt to $3^{rd}$ Party PTT application server 310 via DAP 120. DAP 120 processes the call request from mobile unit 110. As such, as per standard, known iDEN protocol, upon receipt of the call request at DAP 120, DAP 120 performs an initial look-up to determine the location of mobile unit 320 or server 310 via the DAP's visitor location register (VLR), the Recent Call Record (RCR), or the subscriber database. This look-up will direct DAP 120 to a target call processor that is associated with mobile unit 320 or server 310 for forwarding the call request. Since mobile unit 320 and server 310 are utilizing a non-iDEN technology, the target call processor will be associated with iGW 200.

When DAP 120 queries the iDEN subscriber database 130, as shown in step 400 in FIG. 2, the query is directed to either an iDEN home location register (iHLR) or a pseudo iHLR (P-iHLR) that is located on the iGW. If mobile unit 310 has been migrated from the iDEN technology to the 3G technology, the query is directed to the iHLR.

In response to the query from DAP 120, as shown in step 410 in FIG. 2, either the iHLR or the P-iHLR, as appropriate, responds. In this response, an identification is included that is used by DAP 120 to identify the iGW 200 as an iGW, and thus, distinguish the iGW from another urban. This identification may include an identification number of one of the signaling and bearer (SAB) boards of the iGW and/or of an associated target call processor. The present invention is not limited to any particular format or content of the identification. All that is required is that information be provided to DAP 120 that distinguishes the iGW from another urban.

As illustrated in step 420 of FIG. 2, when DAP 120 receives the response, the DAP determines if the identification is associated with the iGW. In an embodiment, DAP 120 is provided with an identification table 140 either via the GTT Database or via the Element Management System's Configuration Manager tool that maintains a list of the identifications that are associated with the iGWs. Thus, DAP 120 checks to determine if the received identification correlates to an identification stored in table 140. If the received identification does correlate to an identification stored in table 140, this indicates that the iGW is an iGW. As such, in step 430, DAP 120 skips the inter-urban call restriction check process and, therefore, as further illustrated in step 440, DAP 120 sends the call request to the target call processor for further processing. Thus, the call attempt is not restricted by the call restriction check process since the process is skipped.

If the received identification does not correlate to an identification stored in table 140, this indicates that the target call processor is not associated with an iGW, but rather, is a DAP in another urban. In this case, as shown in step 450, DAP 120 performs the inter-urban call restriction check process and the call is either completed or rejected based on the known process. Most likely, the call is rejected because the mobile unit 110 is call restricted and the target call processor is another urban.

Thus, as discussed above, in accordance with the principles of the present invention, the call restriction check process capability is maintained for iDEN technology users, however, these iDEN users are now permitted to make calls targeted for called parties or servers that utilize dispatch technologies other than iDEN. These other PTT technologies include, but are not limited to QChat, PoC, and $3^{rd}$ Party PTT application servers, and are inter-operable with iDEN through the iGW. These other technologies are generally referred to herein as 3G technologies, however, the present invention provides utility for interoperability between any technology and any other technology, e.g., 4G technologies, where call restrictions may result in failed call attempts between these technologies.

The disclosed embodiments are illustrative of the various ways in which the present invention may be practiced. Other embodiments can be implemented by those skilled in the art without departing from the spirit and scope of the present invention.

What is claimed is:

1. A method for placing a dispatch call from an Integrated Digital Enhanced Network (iDEN) to a non-iDEN network, comprising the steps of:
performing an inter-urban call restriction check process by an iDEN dispatch call processor if a response to a query indicates that a target dispatch call processor associated with a called entity is associated with the iDEN network and not performing the inter-urban call restriction check process by the iDEN dispatch call processor if the response indicates that the target dispatch call processor is associated with the non-iDEN network.

2. The method of claim 1, wherein if the response indicates that the target dispatch call processor is associated with the non-iDEN network, the target dispatch call processor is associated with an iDEN gateway that provides interoperability between the iDEN network and the non-iDEN network.

3. The method of claim 2, wherein the non-iDEN network is a 3G network.

4. The method of claim 2, wherein the non-iDEN network includes a $3^{rd}$ party dispatch application server.

5. The method of claim 1, wherein if the response indicates that the target dispatch call processor is associated with the iDEN network, the target dispatch call processor is a second iDEN dispatch call processor.

6. The method of claim 3, wherein the 3G network is a Code Division Multiple Access (CDMA) network.

7. The method of claim 3, wherein the 3G network uses Push-to-Talk over Cellular (PoC).

8. The method of claim 1, wherein if the target dispatch call processor is associated with the non-iDEN network, further comprising the step of forwarding a dispatch call request from the iDEN dispatch call processor to the target dispatch call processor.

9. The method of claim 1, wherein the response contains an identification of a signaling and bearer (SAB) board associated with the target dispatch call processor.

10. The method of claim 9, further comprising the step comparing the identification of the SAB board against a list of identifications stored in the iDEN dispatch call processor by the iDEN dispatch call processor.

11. The method of claim 1, wherein if the response indicates that the target dispatch call processor is associated with the iDEN network, and wherein if the inter-urban call restriction check process performed by the iDEN dispatch call processor determines that a calling party is restricted from placing an inter-urban call and that the calling party is not associated with an urban associated with the called entity, a call request by the calling party for a dispatch call to the called entity is rejected by the iDEN dispatch call processor.

12. A system for placing a dispatch call from an Integrated Digital Enhanced Network (iDEN) to a non-iDEN network, comprising:
an iDEN dispatch call processor associated with a mobile unit of a calling party; and
a target dispatch call processor associated with a called entity;
wherein the iDEN dispatch call processor performs an inter-urban call restriction check process if a response to a query indicates that the target dispatch call processor is associated with the iDEN network and wherein the iDEN dispatch call processor does not perform the inter-urban call restriction check process if the response indicates that the target dispatch call processor is associated with the non-iDEN network.

13. The system of claim 12, wherein the non-iDEN network is a 3G network.

14. The system of claim 13, wherein the 3G network is a Code Division Multiple Access (CDMA) network.

15. The system of claim 13, wherein the 3G network uses Push-to-Talk over Cellular (PoC).

16. The system of claim 12, wherein the non-iDEN network includes a $3^{rd}$ party dispatch application server.

17. The system of claim 16, wherein the $3^{rd}$ party dispatch application server is associated with a push-to-X service.

18. The system of claim 12, wherein if the response indicates that the target dispatch call processor is associated with the non-iDEN network, the target dispatch call processor is associated with an iDEN gateway that provides interoperability between the iDEN network and the non-iDEN network.

19. The system of claim 12, wherein if the target dispatch call processor is associated with the non-iDEN network, the iDEN dispatch call processor forwards a dispatch call request to the target dispatch call processor.

20. The system of claim 12, wherein the response contains an identification of a signaling and bearer (SAB) board associated with the target dispatch call processor.

* * * * *